Dec. 28, 1965 H. H. WIEDER 3,226,573
ELECTRICAL PULSE DELAY AND REGENERATOR
CIRCUIT EMPLOYING FOUR-LAYER DIODE
Original Filed Nov. 7, 1961 3 Sheets-Sheet 1

HARRY H. WIEDER
*INVENTOR.*

BY J. M. St. Amand
ATTORNEY

HARRY H. WIEDER
*INVENTOR.*

*BY* J. M. St. Amand
*ATTORNEY*

HARRY H. WIEDER
INVENTOR.

BY J. M. St. Amand
ATTORNEY 3,226,573

ELECTRICAL PULSE DELAY AND REGENERATOR CIRCUIT EMPLOYING FOUR-LAYER DIODE

Harry H. Wieder, Riverside, Calif., assignor to the United States of America as represented by the Secretary of the Navy Original application Nov. 7, 1961, Ser. No. 150,846, now Patent No. 3,137,587, dated June 16, 1964. Divided and this application July 31, 1963, Ser. No. 303,462
5 Claims. (Cl. 307—88.5)
(Granted under Title 35, U.S. Code (1952), sec. 266)

The invention herein described may be manufactured and used by or for the Goverment of the United States of America for governmental purposes without the payment of any royalties thereon or therefor.

The present invention relates to the operation of Hall type generators and more particularly to a delay line operated pulse generator.

This application is a division of parent application Serial No. 150,846 filed November 7, 1961, now Patent No. 3,137,587 for Fabrication and Use of Semiconductor Film-Type Hall Generators.

Two main methods are presently known for producing thin films of indium antimonide, InSb: One, by evaporating stochiometric quantities of InSb in a vacuum upon a heated glass substrate, as described by K. G. Gunther, Zeitsch Naturforsch. 13*a*, 1081 (1958), and a variant of this method is used to produce excellent films of InSb varying in thickness between $0.5\mu$ and $10\mu$; the other, by suddenly squashing a drop of molten InSb between two optical flats and then allowing them to cool, thus producing self supporting films of the order of $10\mu$ thickness, according to Bate and Taylor, Journal of Applied Physics 31,991 (1960).

A major disadvantage of the aforementioned evaporation procedure is the granular nature of the deposit which produces barrier resistances between the semiconductor grains much larger than the effective resistance of the semiconductor grains. Furthermore, the glass substrate is not an efficient thermal conductor, hence heat will be accumulated in the semiconductor film due to Joule heating when a drive current is passed through the film.

The major disadvantage of the squash method is that unless care is taken during the cooling of the film, the differential thermal expansion between the InSb film and the substrate will lead to cracking of the film and/or large stresses between the substrate and the film. If glass is used as the substrate, then the problem of Joule heating also occurs.

The present invention overcomes the foregoing disadvantages in forming a semiconductor film on a ferrite substrate by means hereinafter described. The films produced by the present invention have the following advantages: The excellent adherence between the InSb film and the ferrite substrate yield: a very good coefficient of heat transfer, better by a factor of four or more over that of the evaporated film upon glass. The high permeability of the ferrite multiplies the effective field seen by the film by a factor between 2 and 100, as discussed by H. Hieronymus and H. Weiss, Siemens Zeitsch, 31, 404, (1957). Slow, controlled cooling prevents formation of cracks within the film over a region sufficiently large to prevent subsequent fabrication of a Hall plate. Films as thin as $10^{-4}$ cm. can be produced easily by this method.

It is an object of the invention to provide pulse operation of Hall type generators.

Another object of the invention is to provide a delay line operated pulse generator based on the four layer PNPN diode.

A further object of the invention is to provide a new method of temperature compensation of a Hall plate.

Other objects and many of the attendant advantages of this invention will become readily appreciated as the same becomes better understood by reference to the following detailed description when considered in connection with the accompanying drawings wherein.

Figures 1, 3:
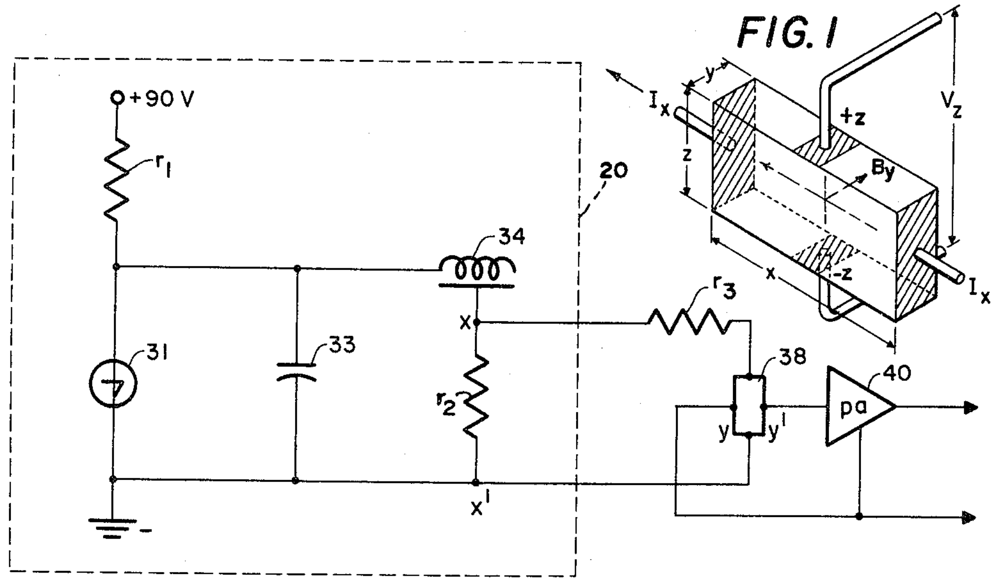
FIGURE 1 is a diagrammatic sketch of a semiconductor slab showing drive current electrodes and Hall potential electrodes.
FIGURE 3 is a schematic circuit diagram showing a simple method for producing the driving current for film type Hall plates.

The Hall effect is a phenomenon due to the deflections of moving charge carriers by a magnetic field at right angles to their direction of motion. If a drive current $I_x$ is applied to a rectangular semiconductor slab, oriented as shown in FIGURE 1, and a magnetic induction $B_y$ is orthogonal with the drive current, then at equilibrium, a field $E_z$ will arise between the excess free charge at the negative *z* surface and the fixed donors or acceptors at the positive *z* surface. The potential difference between these surfaces is the Hall voltage $V_z$ and is defined by the equation:

$$V_z = R_h\left(\frac{I_x \cdot B_y}{y}\right)10^{-8} \text{ volts}$$

The Hall coefficient $R_h$ is a material parameter. It is proportional to the product of the mobility of the charges carriers within a particular material and the specific resistivity of material. The n-type intermetallics have the highest mobility of any known semiconductors. It is of the order of 65,000 cm$^2$ (volt-sec.) for single crystals of indium antimonide. The sensitivity of a Hall device may be defined as the Hall potential per unit magnetic field. It is readily seen from Equation 1 that the highest sensitivity is inversely proportional to the thickness *y*, shown in FIGURE 1, of the semiconductor slab. Consequently, in order to obtain highly sensitive Hall devices, it is desirable that they be fabricated from thin films of indium antimonide.

The method of fabrication of a highly sensitive InSb film type Hall generator is described in detail in parent patent application Serial No. 150,846 aforementioned.

Regardless of what method of preparation is employed for fabricating the InSb films, the increased resistance of the film limits the amount of drive current that may be passed through the film without causing Joule heating, the consequent rise in temperature bringing about a decrease in the Hall coefficient $R_h$ because of the decreased mobility of the charge carriers as well as other factors. Yet as may readily be seen from Equation 1, the Hall voltage per unit magnetic field is directly proportional to the drive current $I_x$ hence for maximum sensitivity a large drive current is desirable.

Figure 2:
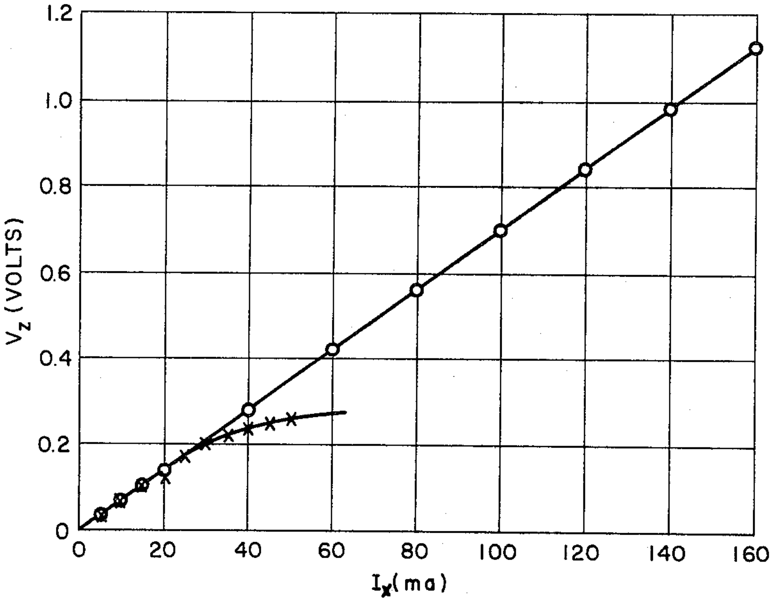
FIGURE 2 is a curve showing the effect of applying a D.C. drive current to an evaporated film Hall plate.

FIGURE 2 shows the effect of applying a D.C. drive current to an evaporated film Hall plate . The resultant Hall voltage at a steady magnetic field of 4 kilogauss is shown to be linear with drive current up to 20 ma. Beyond this value Joule heating sets in giving rise to the nonlinear $V_z$ vs. $I_x$ characteristic. If the drive current is applied in the form of a rectangular pulse of variable amplitude, duration of about 10 $\mu$sec. and a pulse repetition rate of 1 kc., it is seen from the figure that the Hall voltage $V_z$ rises linearly with the peak current $I_p$ (i.e., the peak pulse of $I_x$). The permissible drive current for any Hall plate configuration may be calculated from simple theoretical considerations in terms of the equivalent D.C. heating effects, i.e. the effective current. Given a pulse duration $\tau$ and a pulse repetition rate $\gamma$, the effective current $I_f$ is related to the peak pulse current $I_p$ by:

$$I_f = I_p (\tau\gamma)^{1/2} \quad (2)$$

Figure 4:
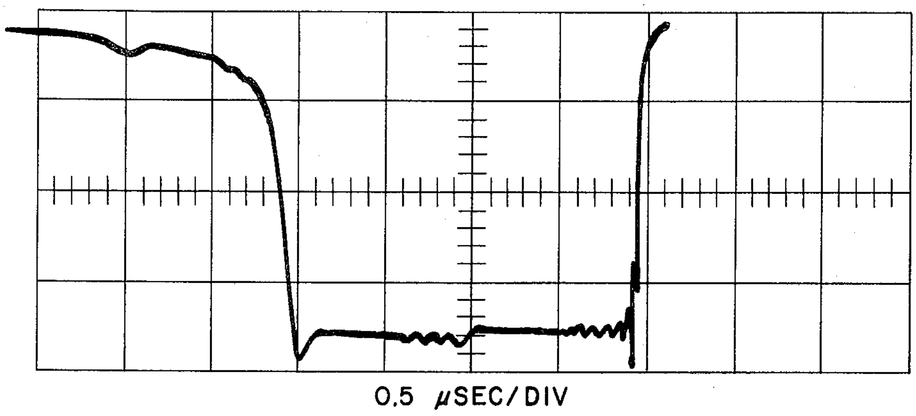
FIGURE 4 shows a typical pulse output obtained across the load resistor, $r_2$, of FIGURE 3 for a delay line having a particular impedance and delay.

Clearly then, for the Hall plate operated under the conditions described above, $\tau = 10^{-5}$ seconds, $\gamma = 10^3$ p.p.s. and $i_{eff} = 20$ ma. Consequently, $I_p$ (max.) = 200 ma. where $I_p$ (max.) is chosen to give a negligibly small change in Hall voltage $V_z$ due to Joule heating and the consequent change in Hall coefficient $R_h$. Since there are no theoretical limitations upon the Hall effect response up to the ultrahigh frequencies, it is to be expected that pulsed durations as short as $10^{-7}$ seconds or less should still prove adequate as driving currents for Hall effect generators. Consequently still larger pulse amplitudes may then be employed in accordance with Equation 2. A simple method for producing the driving current for the film type Hall plate is shown in FIGURE 3 and is contained within the block 20 enclosed by the dashed line. Its operation is as follows: A 4-layer PNPN diode 31 (such as manufactured by the Shockley Corporation of Palo Alto, California, type 4N80D or equivalent) has in many ways the characteristics of a thyratron-type switch and a breakdown voltage of 80±8 volts. Prior to breakdown the resistance of diode 31 is larger than 1 megohm, after breakdown its resistance is less than 10 ohms. If a supply voltage larger than the breakdown voltage, such as (+90 v.) illustrated in the circuit, is applied to diode 31, it breaks down, causing the discharge of capacitor 33, which presents a negative going step function to the delay line 34, and producing a negative pulse across the load resistor $r_2$. The duration of this pulse is determined by the effective electrical length of the delay line 34. If the resistor $r_1$ and capacitor 23 are so chosen that the sum of the conduction and displacement currents at some point during the discharge cycle of the capacitor are less than the sustaining current of the diode (i.e. the current required to keep it in the low resistance state) diode 31 then will snap back to its nonconducting high resistance value and the process will repeat itself. The pulse repetition rate is thus determined primarily by resistor $r_1$ and capacitor 33. For values of capacitor 33 of the order of 0.2 $\mu$f the pulse repetition rate is inversely proportional to resistor $r_1$, between the values of $r_1 = 4 \times 10^3$ ohms and $r_1 = 10^6$ ohms leading to respective pulse repetition rates of 5 kc. and 20 c.p.s. FIGURE 4 shows the pulse output obtained across load resistor $r_2 = 50$ ohms for a delay line having this characteristic impedance and a delay of 1 $\mu$sec.

Figure 5:
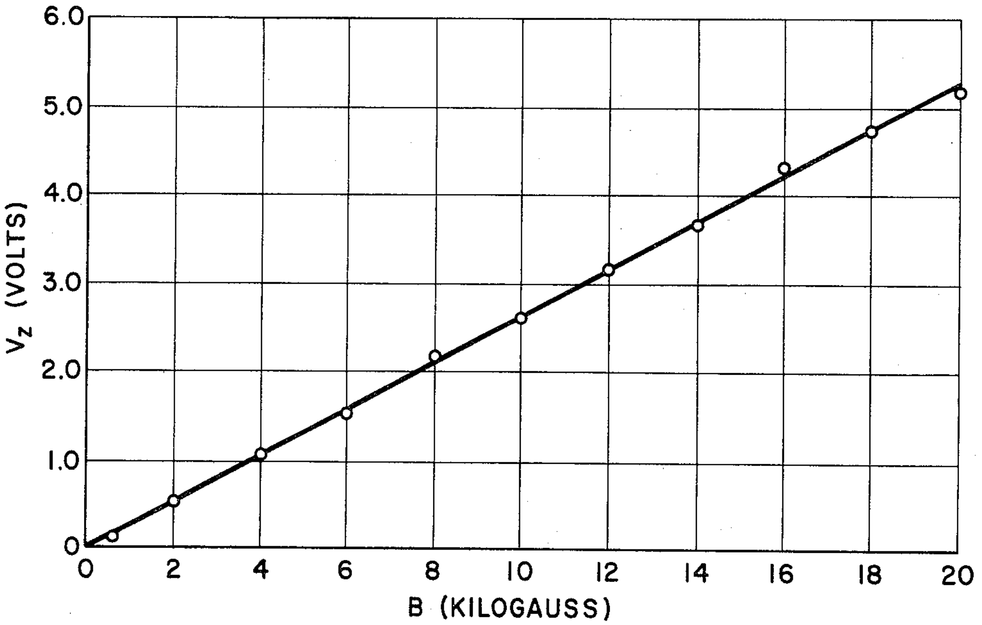
FIGURE 5 is a curve showing the Hall voltage obtained as a function of magnetic field for the circuit of FIGURE 3.
Figure 6:
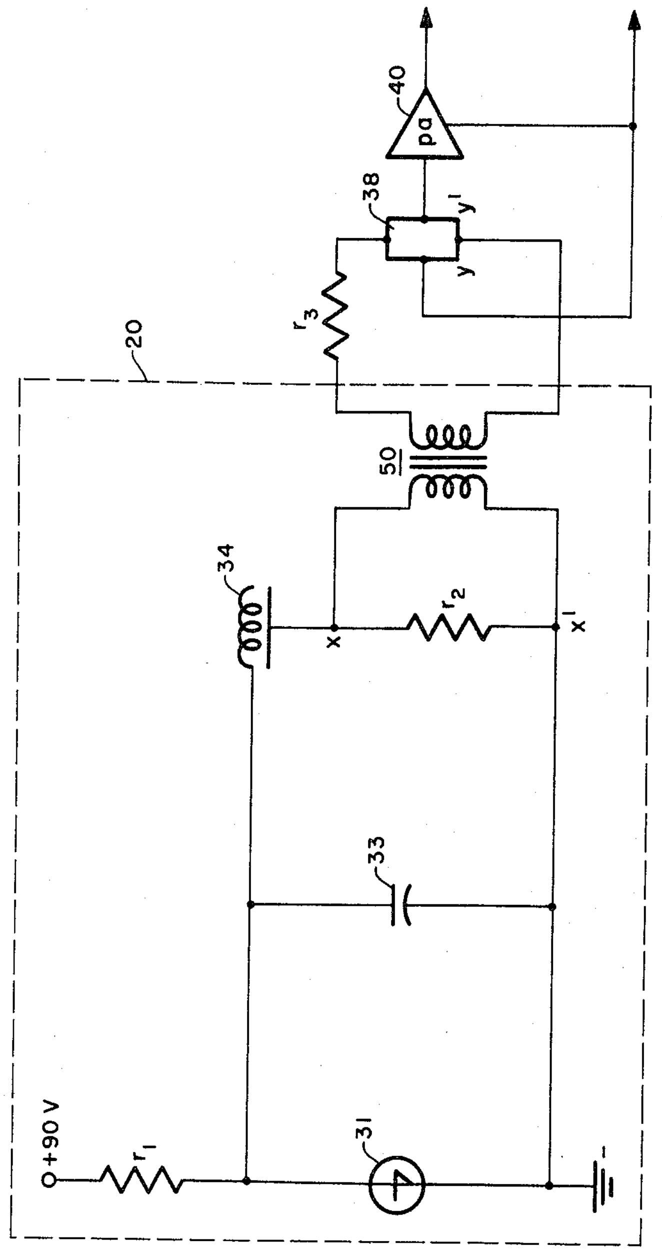
FIGURE 6 is a modification of the circuit of FIGURE 3.

The circuit of FIGURE 3 was developed for the specific purpose of driving the Hall plate, 38, which, in the case illustrated had a resistance across the drive current electrodes of 150 ohms. A simple method was developed for temperature compensation of the Hall signal by adding the resistor $r_3$, in series with the Hall plate. This occurs for the following reasons: The InSb material used to construct the Hall plate 38 had an electron concentration of the order of $10^{17}$ electrons/cm.$^3$. In the temperature range of +25° C. to +100° C. the temperature dependence of the Hall coefficient $R_h$ and of the resistivity is much smaller than for the pure material and is essentially linear. The Hall coefficient $R_h$ decreased from a value of 22 to 18 cm.$^3$/coulomb and the resistance of Hall plate 38 from 150 to 108 ohms in this temperature region. Consequently with due account of Equation 1, one may write:

$$\frac{R_h}{R'_h} = \frac{V'(r_3 + r_p)}{V(r_3 + r'_p)}$$

where $R_h$ and $R_h'$ are respectively the Hall coefficient at +25° C. and +100° C., the series resistor $r_3$ must be calculated from Equation 3 since $r_p = 150$ ohms is the Hall plate resistance and $r_p' = 108$ ohms, V is the potential across load resistor $r_2$ at +25° C. and V' is the potential at +100° C. Letting $(V'/V) = 0.840$, Equation 3 yields the condition for temperature compensation of the Hall plate, i.e. the decrease in $R_h$ is compensated for by an increase in the drive current. Since for the experimental conditions given, the total impedance between $x$ and $x'$ should be equal to the impedance of the delay line, i.e., 50 ohms, all the circuit parameters are thus determined. Thus it is found that series resistor $r_3 = 113$ ohms and load resistor $r_2 = 62$ ohms will yield as Hall voltage $V_z$ independent of temperature to better than 1% within the above indicated temperature range. The Hall voltage obtained as a function of magnetic field for a pulsed drive current of 150 ma. is shown in FIGURE 5. This is the maximum current obtainable from the circuit shown in FIGURE 3. It is, however, not the maximum current that may be applied at any one time to the Hall plate 38 since that value is governed by Equation 2.

The output voltage $V_z$ of Hall plate 38 is applied to a pulse amplifier 40 of standard construction, or to an oscilloscope or some other indicating device. A D.C. voltage may be obtained from this circuit after suitable integration of the pulse voltage across terminals $y$, $y'$. It is important to note, however, that if both the pulse amplifier 40 and the pulse generator 20 (enclosed by dashed line) FIGURE 3 must be grounded the connecting leads broken at 42 and 43 and then an isolation transformer 50 as shown in broken lines should be inserted at $xx'$, in order to prevent ground loops.

The present invention teaches a very highly sensitive pulsed method for driving a thin evaporated or pressed film Hall plate. As disclosed, a sensitivity of 5 volts (kilogauss, ampere)$^{-1}$ may be obtained for many film type Hall devices; for a few Hall devices a sensitivity of 8 volts (kilogauss, ampere)$^{-1}$ was obtained. This may be contrasted with the sensitivity of other Hall generators presently being manufactured, the best having a sensitivity of about only 0.18 volt (kilogauss, ampere)$^{-1}$. The extremely simple circuit of FIGURE 3, for providing the pulse drive current for the Hall generator, can be applicable to other purposes requiring a pulse with a rise time of the order of 0.1$\mu$ seconds and a duration from 0.2$\mu$ seconds to several milliseconds, and capable of delivering a considerable amount of power. The disclosed method for producing temperature compensation of the Hall plate is based upon the specific properties of the thin film semiconductors and the pulse drive circuit.

The method of pulsing of the Hall plate could be changed to fit the particular driving point impedance of the Hall plate. Any other pulse generator is suitable that can provide the necessary driving current pulse in lieu of the one disclosed. It should be pointed out, however, that the pulse method described herewith is suitable primarily for higher impedance films. For bulk type Hall detectors, the driving impedance being of the order of one ohm, the large pulse current required do not make these devices suitable for pulsed operation.

Other methods or combination of methods may be used to provide proper temperature compensation of the Hall plate; however, the one described herein has the advantage of simplicity.

For directional effects, the ferrite substrate may have additional ferrite plates added to the construction in order to increase the field multiplying effect and decrease the demagnetizing factor of a Hall detector assembly.

The use of pulsed operation for Hall effect devices encompasses the range of application of Hall generators covered by W. J. J. Grubbs, Bell System Technical Journal 38, 853 (1959). When the Hall plate is used for the detection of small magnetic fields, assuming a minimum detectable Hall voltage pulse of $10\mu$ volts, the minimum magnetic field that can be detected in this fashion is seen to be of the order of $10^{-2}$ to $10^{-3}$ gauss or better.

Obviously many modifications and variations of the present invention are possible in the light of the above teachings. It is therefore to be understood that within the scope of the appended claims the invention may be practiced otherwise than as specifically described.

What is claimed is:

1. A delay line operated pulsed generator circuit comprising:

(a) a four-layer PNPN diode in series with a first resistor connected across a pair of input terminals, (b) a source of supply voltage connected to said input terminals, (c) a discharge capacitor connected parallel with said PNPN diode, (d) a delay line in series with a load resistor connected parallel with said capacitor, (e) said load resistor also connected across a pair of output terminals, (f) a supply voltage, from said source, larger than the breakdown voltage of said PNPN diode applied thereto causing said diode to break down to its low resistance state, in turn causing the discharge of said capacitor which presents a negative going step function to said delay line and producing a negative pulse across said load resistor and thus across said output terminals, (g) said first resistor and said capacitor being chosen so that the sum of the conduction and displacement currents at some point during the discharge cycle of the capacitor are less than the sustaining current which keeps said PNPN diode in its low resistance state causing the diode to snap back to its nonconducting high resistance state ready for the process to repeat itself.

2. A delay line operated pulsed generator circuit comprising:

(a) a PNPN diode connected across a pair of input terminals, (b) a voltage source connected to said input terminals, (c) a capacitor connected in parallel with said diode, (d) a delay line in series with a load resistor connected parallel with said capacitor, (e) a pair of output terminals connected across said load resistor, (f) a voltage, from said source, larger than the breakdown voltage of said diode applied thereto causing said diode to break down to its low resistance state, in turn causing the discharge of said capacitor which presents a negative going step function to said delay line and producing a negative pulse across said load resistor and thus across said output terminals, (g) said capacitor being chosen so that the currents at some point during the discharge cycle of the capacitor are less than the sustaining current which keeps said diode in its low resistance state causing the diode to snap back to its nonconducting high resistance state ready for the process to repeat itself.

3. A circuit for pulse operation of Hall type generators comprising:

(a) a four-layer PNPN diode in series with a first resistor connected across a pair of input terminals, (b) a source of supply voltage connected to said input terminals, (c) a discharge capacitor connected parallel with said PNPN diode, (d) a delay line in series with a load resistor connected parallel with said capacitor, (e) a supply voltage, from said source, larger than the breakdown voltage of said PNPN diode applied thereto causing said diode to break down to its low resistance state, in turn causing the discharge of said capacitor which presents a negative going step function to said delay line and producing a negative pulse across said load resistor, (f) said first resistor and said capacitor being chosen so that the sum of the conduction and displacement currents at some point during the discharge cycle of the capacitor are less than the sustaining current which keeps said PNPN diode in its low resistance state causing the diode to snap back to its nonconducting high resistance state ready for the process to repeat itself, (g) a Hall plate having drive current electrodes and output electrodes, (h) a temperature compensating resistance in series with the Hall plate drive current electrodes connected in parallel across said load resistor, (i) a Hall voltage obtained from the output of said Hall plate as a function of the pulsed drive current across the Hall plate drive current electrodes.

4. A circuit as in claim 3 wherein the output from the Hall plate is fed to a pulse amplifier.

5. A circuit as in claim 4 wherein the pulse amplifier and circuit for pulse operation of the Hall generator are grounded, and an isolation transformer is provided between said load resistor and said series connected temperature compensating resistance and Hall plate to prevent ground loops.

References Cited by the Examiner

UNITED STATES PATENTS 3,048,710 8/1962 Shockley ---------- 307—88.5

ARTHUR GAUSS, *Primary Examiner.*